United States Patent

Kawamura

[11] Patent Number: 5,870,478
[45] Date of Patent: Feb. 9, 1999

[54] MODULAR EXPONENTIATION CALCULATION APPARATUS AND METHOD

[75] Inventor: Shinichi Kawamura, Tokyo, Japan

[73] Assignee: Kabushiki Kaisha Toshiba, Kawasaki, Japan

[21] Appl. No.: 785,845

[22] Filed: Jan. 24, 1997

[30] Foreign Application Priority Data

Jan. 26, 1996 [JP] Japan .................................. 8-011938

[51] Int. Cl.⁶ .................................................... H04K 1/00
[52] U.S. Cl. ............................................. 380/30; 380/28
[58] Field of Search ........................................ 380/30, 28

[56] References Cited

U.S. PATENT DOCUMENTS

| | | | |
|---|---|---|---|
| 5,274,707 | 12/1993 | Schlafy | 380/30 |
| 5,299,262 | 3/1994 | Brickell et al. | 380/28 |
| 5,313,530 | 5/1994 | Iwamura | 380/30 |
| 5,321,752 | 6/1994 | Iwamura et al. | 380/28 |
| 5,349,551 | 9/1994 | Petro | 364/746 |
| 5,499,299 | 3/1996 | Takenaka et al. | 380/30 |

FOREIGN PATENT DOCUMENTS 4-362988  12/1992  Japan .

OTHER PUBLICATIONS

Comba, "Exponentiation Cryptosystems on the IBM PC," IBM Systems Journal, V29, N40, pp. 526–538, 1990.
Shinichi Kawamura et al. "A Fast Exponentiation Algorithm," *IEICE Transactions*, vol. E74, No. 8, pp. 2136–2142. (Aug. 1991).

*Primary Examiner*—David Cain
*Attorney, Agent, or Firm*—Finnegan, Henderson, Farabow, Garrett & Dunner, L.L.P.

[57] ABSTRACT

In the modular exponentiation calculation apparatus of the present invention, a computer calculates a modular exponentiation $C = M^E \bmod N$ (M,N: integral number, E: exponent expressed in base m, C: calculation result expressed in base b). A table generation section calculates values of $M^j \cdot b^i \bmod N$ (b,n,m: constant, j=1,2,...,m−1, i=0,1,...,n−1) and generates a table having (m−1)-columns and n-rows in which the calculation values are stored as corresponding elements. A first calculation section calculates a multiplication sum $$\sum_{i=0}^{n-1} Ci \cdot (M^{ej} \cdot b^i \bmod N)$$

(Ci: value of each digit of C, ej: non-zero value of j-th digit of E, $M^{ej} \cdot b^i \bmod N$: row elements of ej-column of the table) as updated C. A second calculation section calculates $C^m \bmod N$ for the updated C. A control section controls the first calculation section and the second calculation section to repeat the calculation for each non-zero value of each digit of E from MSB to LSB by unit of digit.

10 Claims, 11 Drawing Sheets

|  | m=2 | m=16 |
|---|---|---|
| PRIOR ART | 100 | 83 |
| TABLE METHOD | 84 | 76 (PRESENT INVENTION) |

FIG. 11

MODULAR EXPONENTIATION CALCULATION APPARATUS AND METHOD

BACKGROUND OF THE INVENTION

1. Field of the Invention

The present invention relates to a modular exponentiation calculation apparatus and method for quickly calculating the modular exponentiation in the technical region of data transmission and data processing.

2. Description of the Related Art

In case of transmitting data, it is necessary to encipher the data. In this case, a modular exponentiation calculation is well known as a public key method as follows.

$$C = M^E \bmod N$$

In the above equation, M is a plain text to be enciphered, N and E are encryption keys, and C is an encryption result (M,E,N: integral number). "mode N" represents an operation to compute the remainder of the division operation, $M^E$/N. FIG. 1 is a block diagram of data transmission system including an encryption section (transmission side) and a decryption section (receiving side). When the plain text M is inputted, the encryption section enciphers M according to the encryption keys N,E and transmits the encryption result C to the decryption section. The decryption section deciphers the encryption result C according to decryption key N, D=f(E) and outputs the plain text (decryption result) M. In this case, a large number of bits of N is necessary in order to keep a secret of the plain text M. For example, in trade cipher, 512 bits or 1024 bits as length of N is used. As a result, calculation quantity of the modular exponentiation increases heavily and a method to fastly calculate the modular exponentiation is necessary. In case of calculating the modular exponentiation, the modular exponentiation calculation is expanded as a series of modular multiplications. In various kinds of expansion method, a base m calculation method as excellent expansion method is well known. FIG. 2 is a flow chart of processing of base m modular exponentiation calculation method according to the prior art. Assumed that modular exponent E is expanded in base m as follows.

$$E = \sum_{j=0}^{l-1} e_j \cdot m^j$$

In the above equation, ej represents each digit of E so that ($0 \leq e_j \leq m-1$). After the plain text M and the encryption keys N,E are inputted (S21), M, $M^2$ modN, $M^3$ modN, ..., $M^{m-1}$ mod N are calculated and stored in memory $A_1, A_2, A_3, \ldots, A_{m-1}$ respectively (S22). Parameter (j) is initialized as (1-1) and variable (c) is initialized as 1 (S23). Then, modular exponent E is scanned from MSB (most-significant-digit) to LSB (least-significant-digit) by unit of digit. The following calculation is repeated according to value of each digit ej (S24).

$$C \leftarrow C \times A_{ej} \bmod N \; (A_{ej}: M\; e_j \bmod N) \; (S25) \quad (1)$$

$$C \leftarrow C^m \bmod N \; (S27) \quad (2)$$

In this place, when LSB ($e_o$) is scanned, the above calculation (2) is not executed (S26).

The above calculation (1) consists of multiplication and division. FIG. 3 is a block diagram of a calculation circuit for the above calculation (1). In the calculation circuit, calculation quantity of the multiplication is same as that of the division. Therefore, in order to execute the above calculation (1), two times of calculation quantity of the multiplication is necessary.

In this place, in repeat loop of the flow chart in FIG. 2, M and N are constants and do not change in the loop. Therefore, M, $M^2$ modN, $M^3$ modN, ..., $M^{m-1}$ modN are also constants. Therefore, the above calculation (1) is exponentiation which variable C is multiplied by constant and divided by N. This is called multiplication with a constant multiplier. Therefore, in comparison with prior method using multiplication and division, new calculation method to reduce the processing time has been considered. For example, in case of "m=2" or binary in the above calculation, the exponentiation is executed using the minimum amount of memory. As for binary, the multiplication with constant multiplication as calculation quantity of one time of multiplication is disclosed in reference (Shin-ichi Kawamura, Kyoko Takabayashi, and Atsushi Shimbo: "A fast modular exponentiation algorism", IEICE Trans.. Vol. E74, No. 8, pp. 2136–2143, August 1991). In the above reference, in case of "m=2", the multiplication with constant multiplier is executed by calculation quantity of one time of multiplication. However, in case of "m>2", it is not possible to quickly calculate the multiplication with constant multiplier.

SUMMARY OF THE INVENTION

It is an object of the present invention to provide a modular exponentiation calculation apparatus and method to quickly calculate the modular exponentiation for modular algorithm in base m (m>2).

According to the present invention, there is provided a modular exponentiation calculation apparatus for calculating a modular exponentiation $C = M^E$ modN (M,N: integral number, E: exponent in base m, C: base b), comprising: table generation means for calculating value of $M^j \cdot b^i$ modN (b,n,m: constant, j=1,2 ..., m−1, i=0,1, ..., n−1), and for generating a table of (m−1)-column and n-row in which the calculation values are stored as corresponding elements; first calculation means for calculating a multiplication sum:

$$\sum_{i=0}^{n-1} Ci \cdot (M^{ej} \cdot b^i \bmod N)$$

as updated c wherein Ci is the value of each digit of c, ej is a non-zero value of j-th digit of E, $M^{ej} \cdot b^i$ modN are row elements of ej-column of the table; second calculation means for calculating $C^m$ modN for the updated C calculated by said first calculation means; and control means for controlling said first calculation means and second calculation means to repeat the calculation for non-zero value of each digit of E from MSB to LSB by unit of digit.

Further in accordance with the present invention, there is provided a method for calculating a modular exponentiation $C = M^E$ modN (M,N: integral number, E: exponent in base m, C: base b), comprising the steps of: calculating value of $M^j \cdot b^i$ modN (b,n,m: constant, j=1,2 ..., m−1, i=0,1, ..., n−1), generating a table in a machine readable memory having (m−1)-column and n-row in which the calculation values are stored as corresponding element; first-calculating a multiplication sum $$\sum_{i=0}^{n-1} Ci \cdot (M^{ej} \cdot b^i \bmod N)$$

as updated C wherein Ci is a value of each digit of C, ej is a non-zero value of j-th digit of E, $M^{ej} \cdot b^i$ modN are row elements of ej-colunm of the table; second-calculating $C^m$ modN for the updated C calculated at the first-calculating step; and repeating the first-calculating step and the second-calculating step for non-zero value of each digit of E from MSB to LSB by unit of digit.

Further in accordance with the present invention, there is provided a computer readable memory containing computer-readable instructons to calculate a modular exponentiation C=$M^E$ modN (M,N: integral number, E: exponent of m-ary, C: b-ary), comprising: instruction means for causing a computer to calculate value of $M^j \cdot b^i$ modN (b,n,m: constant, j=1,2..., m−1, i=0,1,..., n−1); instruction means for causing a computer to generate a table of (m−1)-column and n-row in which the calculation values are stored as corresponding element; instruction means, for causing a computer to calculate a multiplication sum $$\sum_{i=0}^{n-1} Ci \cdot (M^{ej} \cdot b^i \bmod N)$$

as updated C wherein Ci is a value of each digit of C, ej is a non-zero value of j-th digit of E, $M^{ej} \cdot b^i$ modN are row elements of ej-colmun of the table) as updated C; instruction means for causing a computer to calculate $C^m$ modN for the updated C; and instruction means for causing a computer to repeat the calcution of the multiplication sum and $C^m$ modN for non-zero value of each digit of E from MBS to LSB by unit of digit.

BRIEF DESCRIPTION OF THE DRAWINGS

FIG. 11 is a schematic diagram of relative processing time of the modular exponentiation calculation method according to the prior art and the present invention.

DETAILED DESCRIPTION OF THE PREFERRED EMBODIMENTS

The embodiments of the present invention are described below with reference to the drawings.

The present invention may be embodied in a modular exponentiation calculation apparatus used in, for example, data transmission or data transfer. Exponentiation calculations are useful in encryption devices such as coders or decoders. A disital data processor and machine readable memories may be included in the modular exponentiation calculation apparatus.

Figure 1:
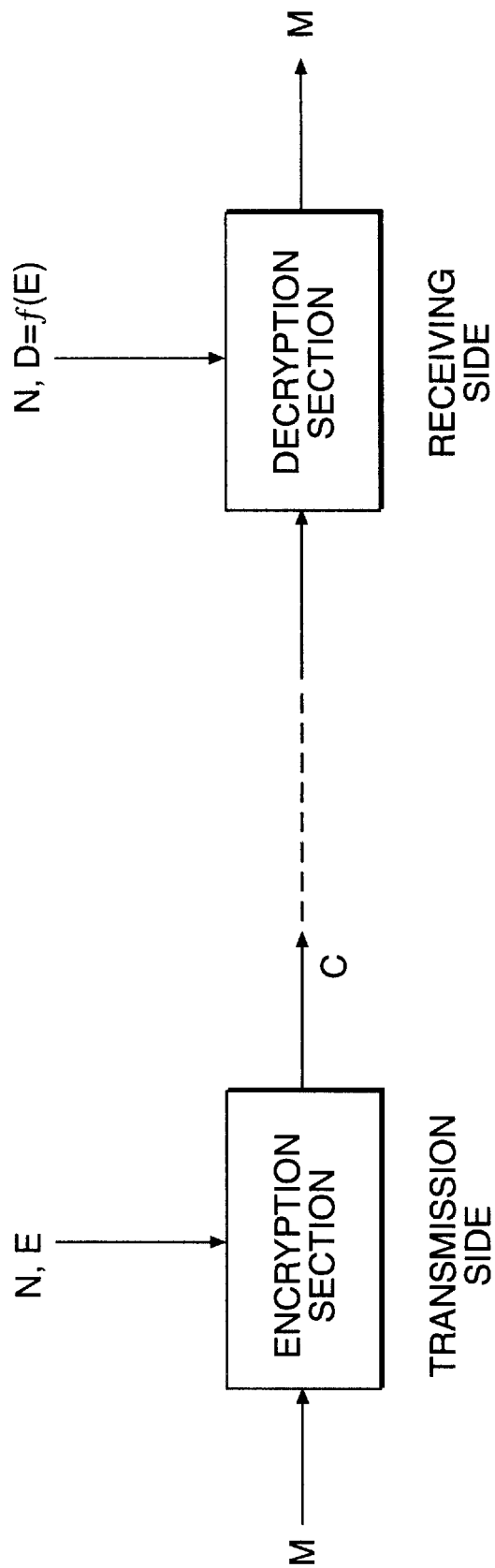
FIG. 1 is a schematic diagram of an encryption-decription system including a modular exponentiation calculation apparatus.
Figure 2:
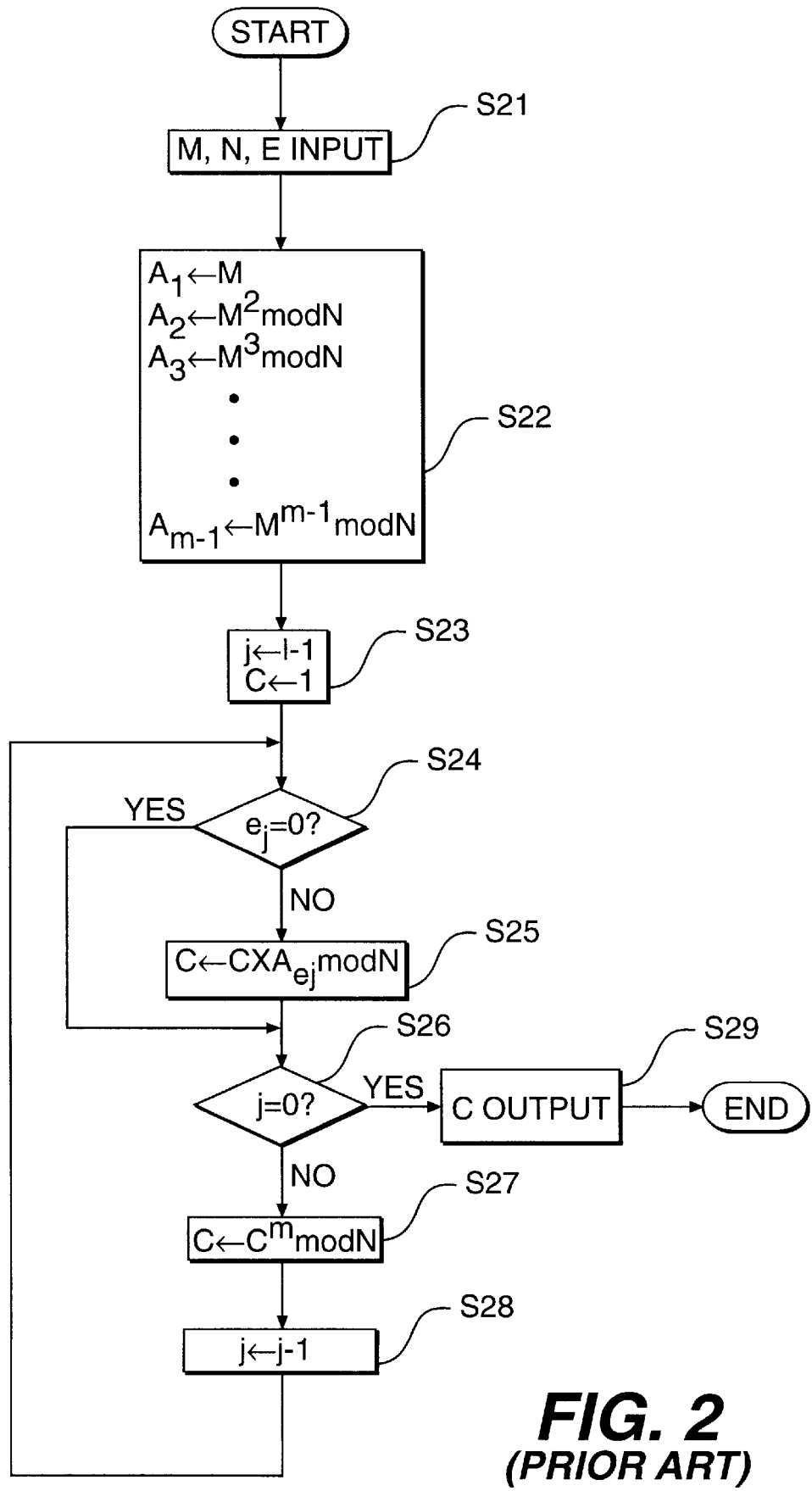
FIG. 2 is a flow chart of processing of the modular exponentiation calculation method according to the prior art.
Figure 3:
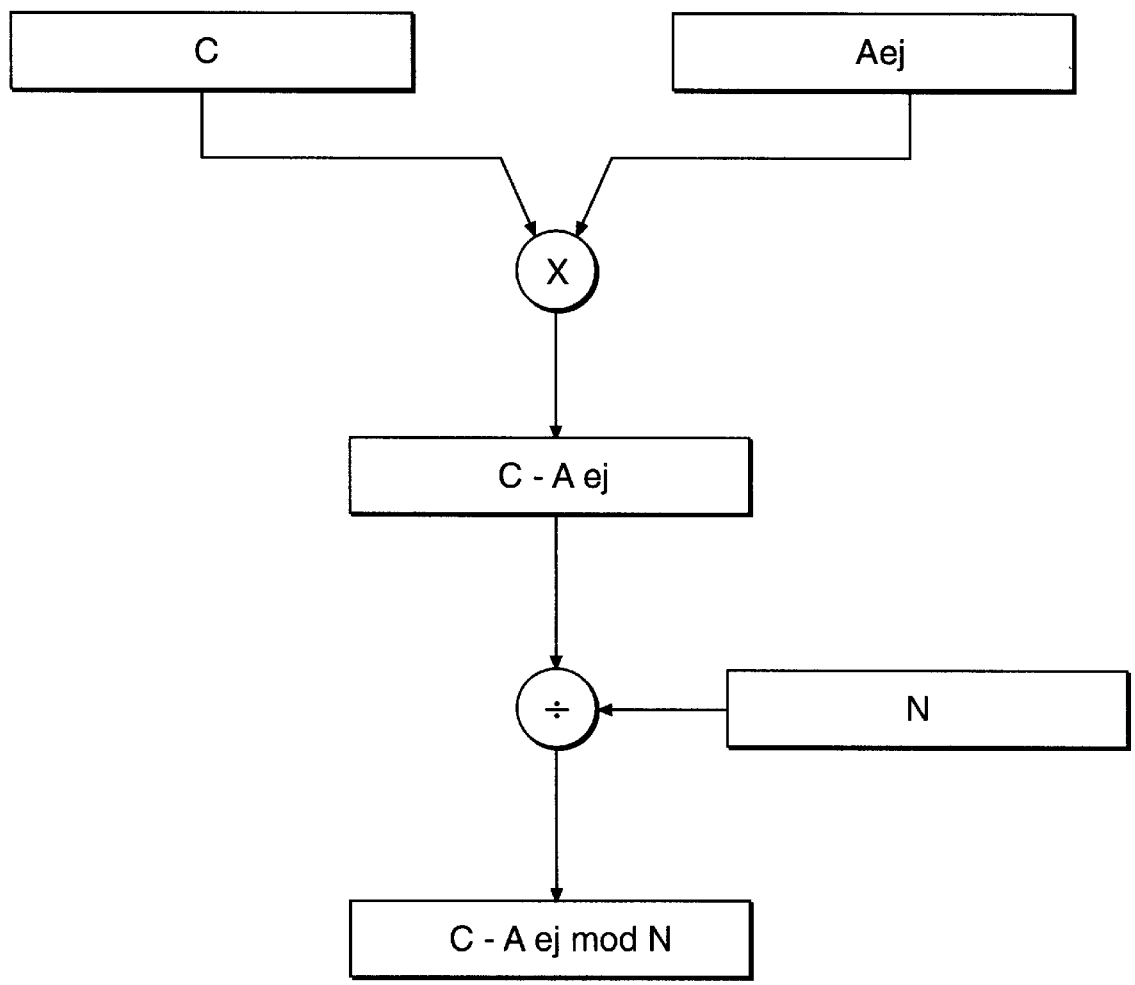
FIG. 3 is a schematic diagram of a part of the modular exponentiation calculation apparatus according to the prior art.
Figure 4:
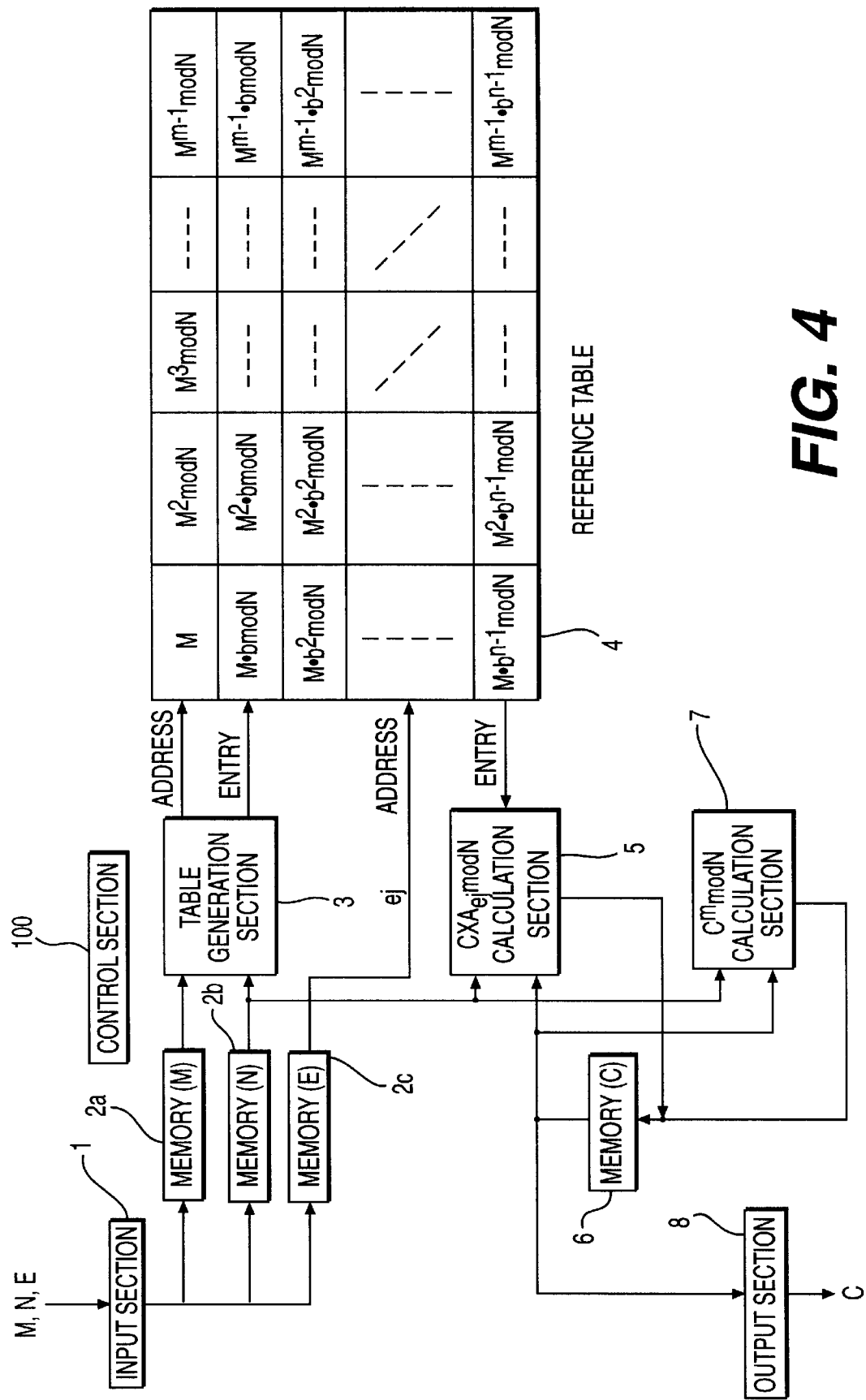
FIG. 4 is a block diagram of the modular exponentiation calculation apparatus according to the present invention.
Figure 5:
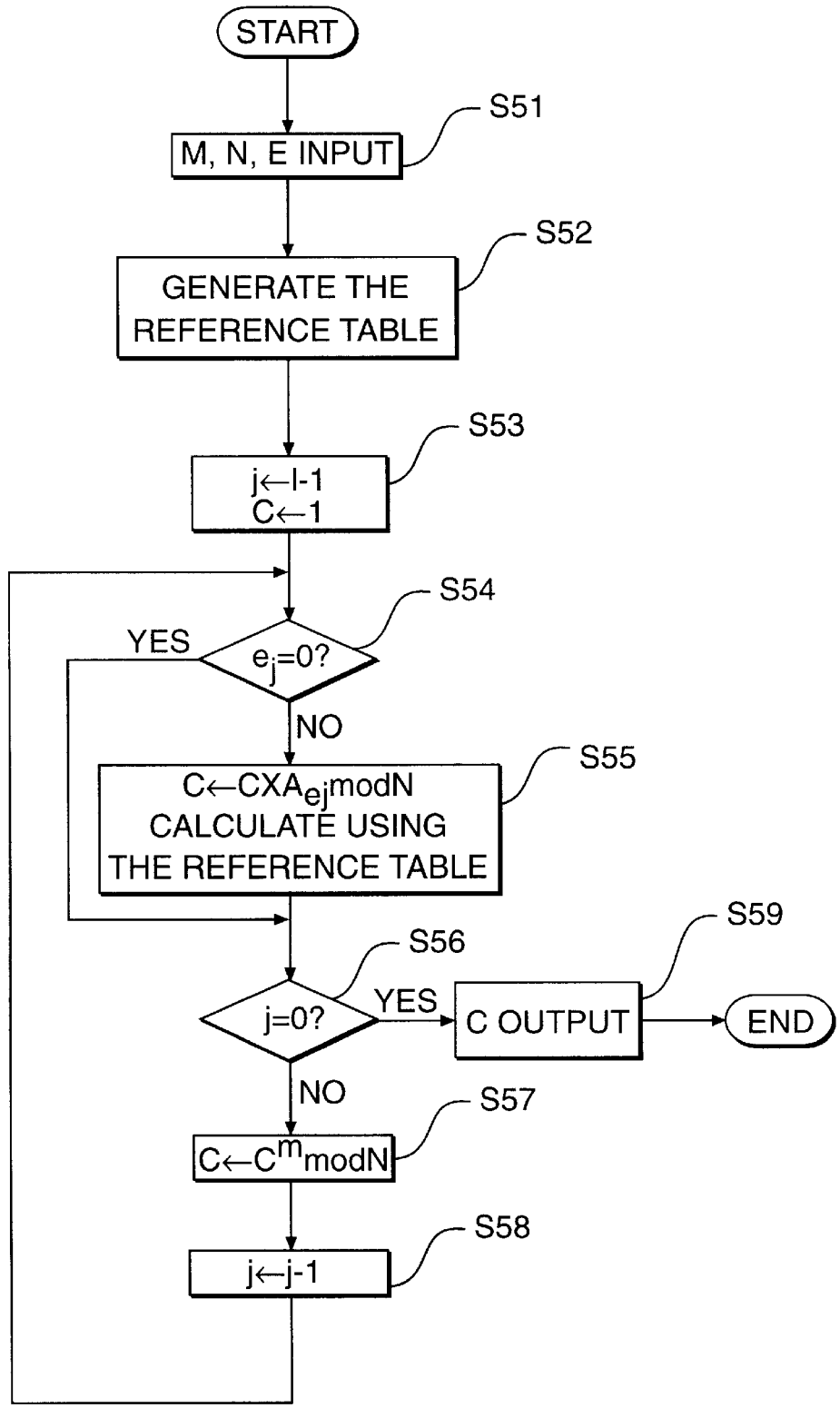
FIG. 5 is a flow chart of processing of the modular exponentiation calculation method according to the present invention.

FIG. 4 is a block diagram of the modular exponentiation calculation apparatus according to the present invention. FIG. 5 is a flow chart of processing of the modular exponentiation calculation method according to the present invention. First, the plain text M, and the encryption keys N, E are inputted through an input section 1 and stored in a memory (M) 2a, a memory (N) 2b and a memory (E) 2c respectively (S51). A table generation section 3 generates a reference table 4 of (m−1) column×n row according to M,N (S52). As shown in the reference table of FIG. 4, entry (element) of 1st-column from 1st row to (n−1)th row is M, $M \cdot b$ modN, $M \cdot b^2$ modN, ..., $M \cdot B^{n-1}$ modN. "b" is a unit of processing (processing block) of the multiplication with constant multiplier and normally set as power of 2 in a binary computer. In case of "N=1 bit", 1=$n\log_2$ (b). The entry of 2nd-column is $M^2 \cdot$ modN, $M^2 \cdot$bmodN, ..., $M^2 \cdot b^{n-1}$ modN. The entry of 2nd-column is M times as much as the entry of 1st-column. The entry of 3rd-column is $M^2$ times as much as the entry of 1st column. The entry of (m−1)th-column is $M^{m-1}$ times as much as the entry of 1st column. In the above-mentioned reference, the table reference method uses only the 1st-column of the reference table 4 in FIG. 4. However, in the present invention, each element of 1st-column is expanded along side direction in order to normalize as elements of (m−1) th column (m>2). By referring to the table, the modular exponentiation calculation (S55 in FIG. 5) is quickly executed.

Figure 6:
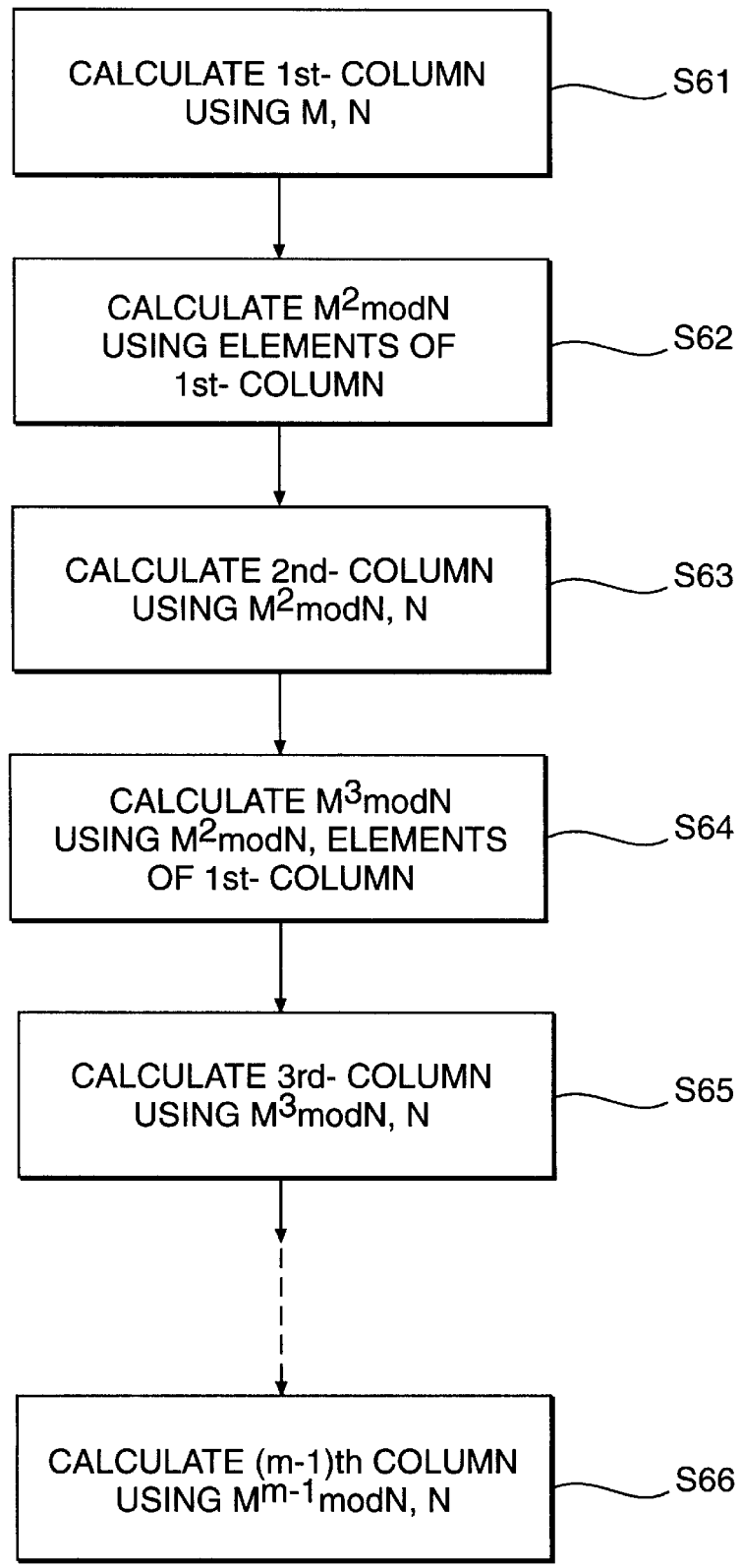
FIG. 6 is a flow chart of processing of generating a reference table according to the present invention.

FIG. 6 is a flow chart of processing of generating the reference table 4 according to the present invention. In this processing, each element of the 1st-column of the reference table 4 is firstly calculated. Each element of the 2nd-column (3rd-column and so on) is calculated using the elements of the 1st-column to effectively generate the reference table. First, the elements (M, $M \cdot b$ modN, $M \cdot b^2$ modN, ..., $M \cdot b^{n-1}$ modN) of the 1st-column are calculated using M, N (S61). Second, an element "$M^2$ modN" of the 2nd-column and the 1st-row is calculated using the elements of the 1st-column (S62).

Figure 7:
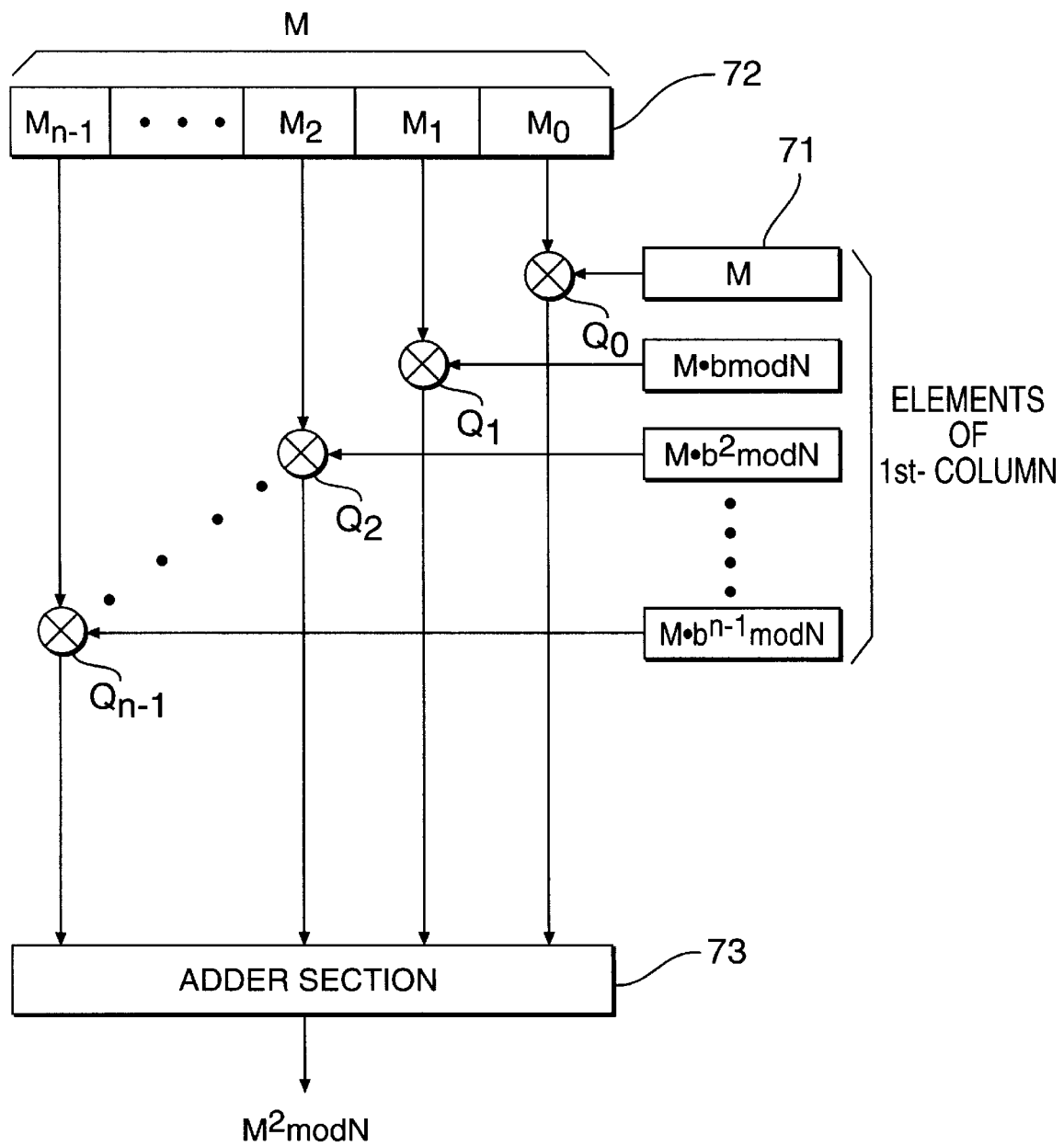
FIG. 7 is a block diagram of a table generation section corresponding to a first half processing of generating the reference table according to the present invention.
Figure 8:
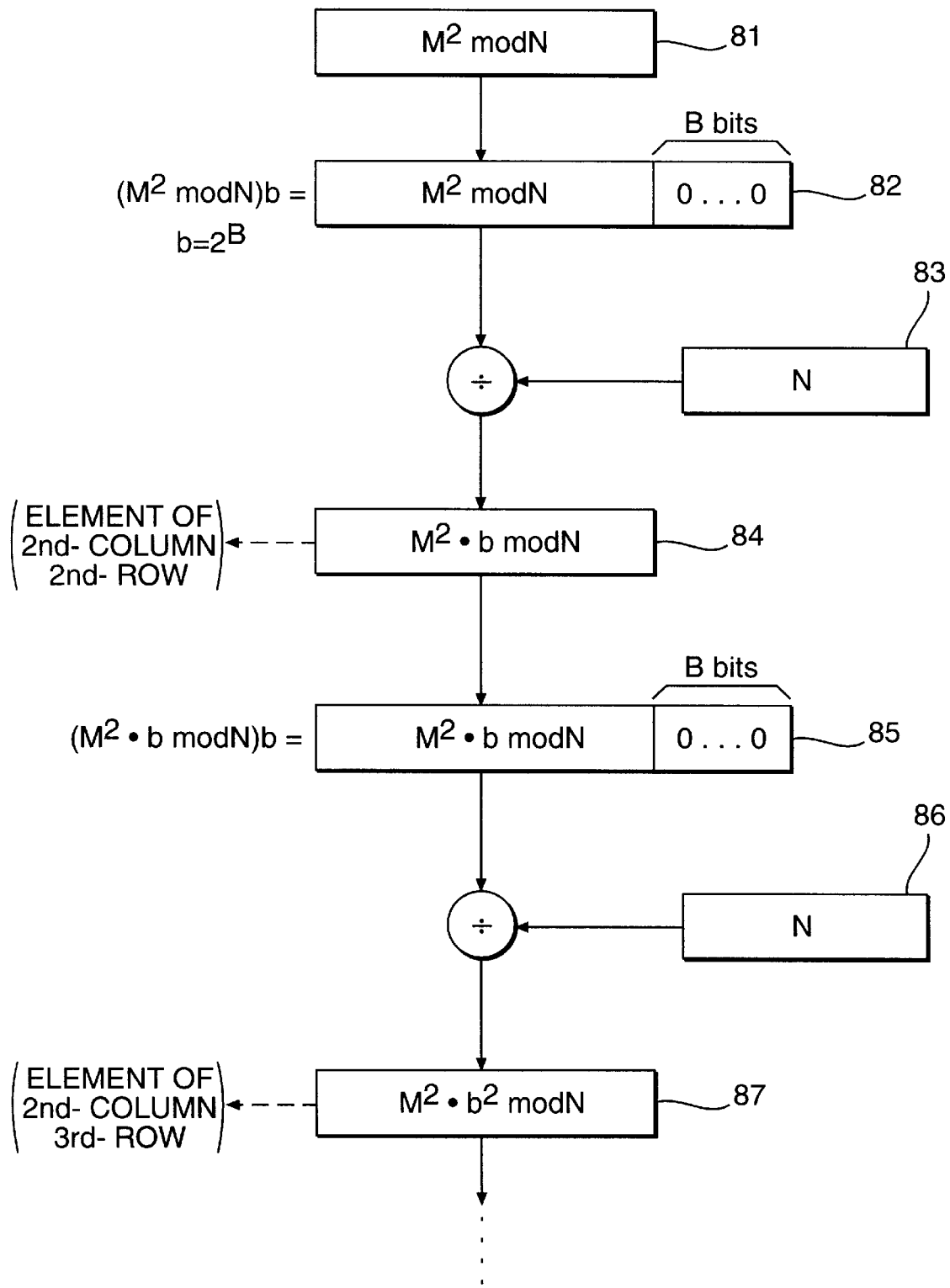
FIG. 8 is a block diagram of the table generation section corresponding to a second half processing of generating the reference table according to the present invention.

FIG. 7 is a block diagram of calculation circuit to execute S62. As shown in FIG. 7, each element of the 1st-column is stored in register 71 and each digit (n-digits) of M is stored in register 72. Each multiplication $Q_0, \ldots, Q_{n-1}$ multiplies each digit of M with the corresponding element of the 1st-column (one multiplication may orderly multiply the each digit of M with the corresponding element of the 1st-column). The multiplication results from the multiplication $Q_0, \ldots, Q_{n-1}$ are sumed by an adder section 73. In this way, the element "$M^2$ modN" of the 2nd-column and 1st-row is calculated. Next, the elements ($M^2 \cdot$ bmodN, $M^2 \cdot b^2$ modN, ..., $M^2 \cdot b^{m-1}$ modN) of 2nd-column except for "$M^2$ modN" are calculated using $M^2$ modN and N (S63). FIG. 8 is a block diagram of calculation circuit to execute S63. As shown in FIG. 8, "$M^2$ modN" is stored in a register 81.

In case of "b=$2^B$", B bits of "0" are added to "$M^2$ modN" as LSB in a register 82. The value of the register 82 represents "($M^2$ modN)b". Then, "($M^2$ modN)b" of the register 82 is divided by "N" of a register 83. The division result "$M^2 \bullet$ b modN" of a register 84 is an element of 2nd-column and 2nd-row. In the same way, B bits of "0" are added to "$M^2 \bullet$ b modN" as "($M^2 \bullet$ b modN)b" of a register 85. "($M^2$ bmodN)b" of the register 85 is divided by "N" of a register 86. The division result "$M^2 \bullet b^2$ b modN" of a register 87 is an element of 2nd-column and 3rd-row. In this way, the division calculation is repeated till "$M^2 \bullet b^{n-1}$ modN" as an element of 2nd-column and (n-1) row is calculated. Next, an element "$M^3$ modN" of 3rd-column and 1st-row is calculated using "M modN" and the elements of 1st-column (S64). This calculation is executed by, the circuit of FIG. 7. Next, the elements of 3rd-column except for "$M^3$ modN" are calculated using "$M^3$ modN" and N (S65). This calculation is executed by the circuit of FIG. 8. The above calculation using circuit of FIG. 7 and FIG. 8 is repeated untill the elements of (m-1)th column are calculated using "$M^{m-1}$ modN" and N (S66).

As the above-mentioned, an element of i-th column and 1st-row is calculated using the element of (i-1)th column and 1st-row, and the elements of 1st-column. The other elements of i-th column are calculated using the elements of i-th column and 1st-row. This calculation is repeated to generate all elements of the reference table 4.

In return to FIG. 5, after generating the reference table 4, parameter (j) is intialized as (l-1) and variable C is initialized as "1" (S53). In this place, modular exponent E is expanded in base m. Therefore, each digit ej (corresponding to 1 ~m-1) is decided to be "0" or not from the digit of MSB (S54). In case that the digit is "0", processing of S55 is skipped. In case that the digit is not "0", processing of S55 is executed. In this case, ($C \times A_{ej}$ modN) calculation section 5 calculates "$Cx_{ej}$ modN" using the reference table 4 (S55). Then, ($C^m$ modN) calculation section 7 calculates $C^m$ modN (S57). The calculations of ($C \times A_{ej}$ modN) calculation section 5 and ($C^m$ modN) calculation section 7 are executed alternatively. The calculation result C by ($C \times A_{ej}$ modN) calculation section 5 and ($C^m$ modN) calculation section 7 is alternatively stored in a memory (C) 6. In this way, the modular exponentiation calculation is effectively executed.

Figure 9:
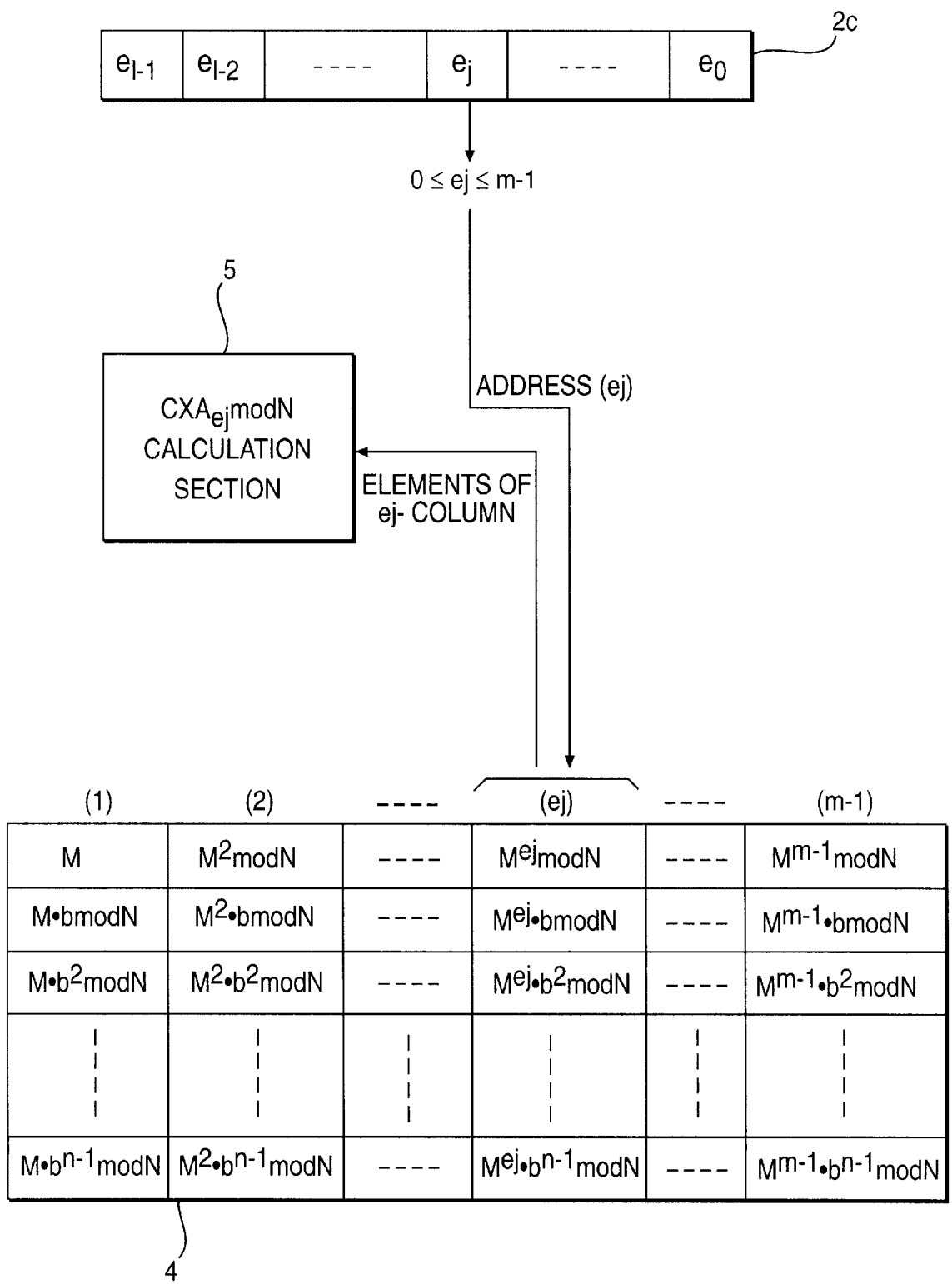
FIG. 9 is a schematic diagram of the reference table in case of retrieving element of (ej) th-column according to the present invention.
Figure 10:
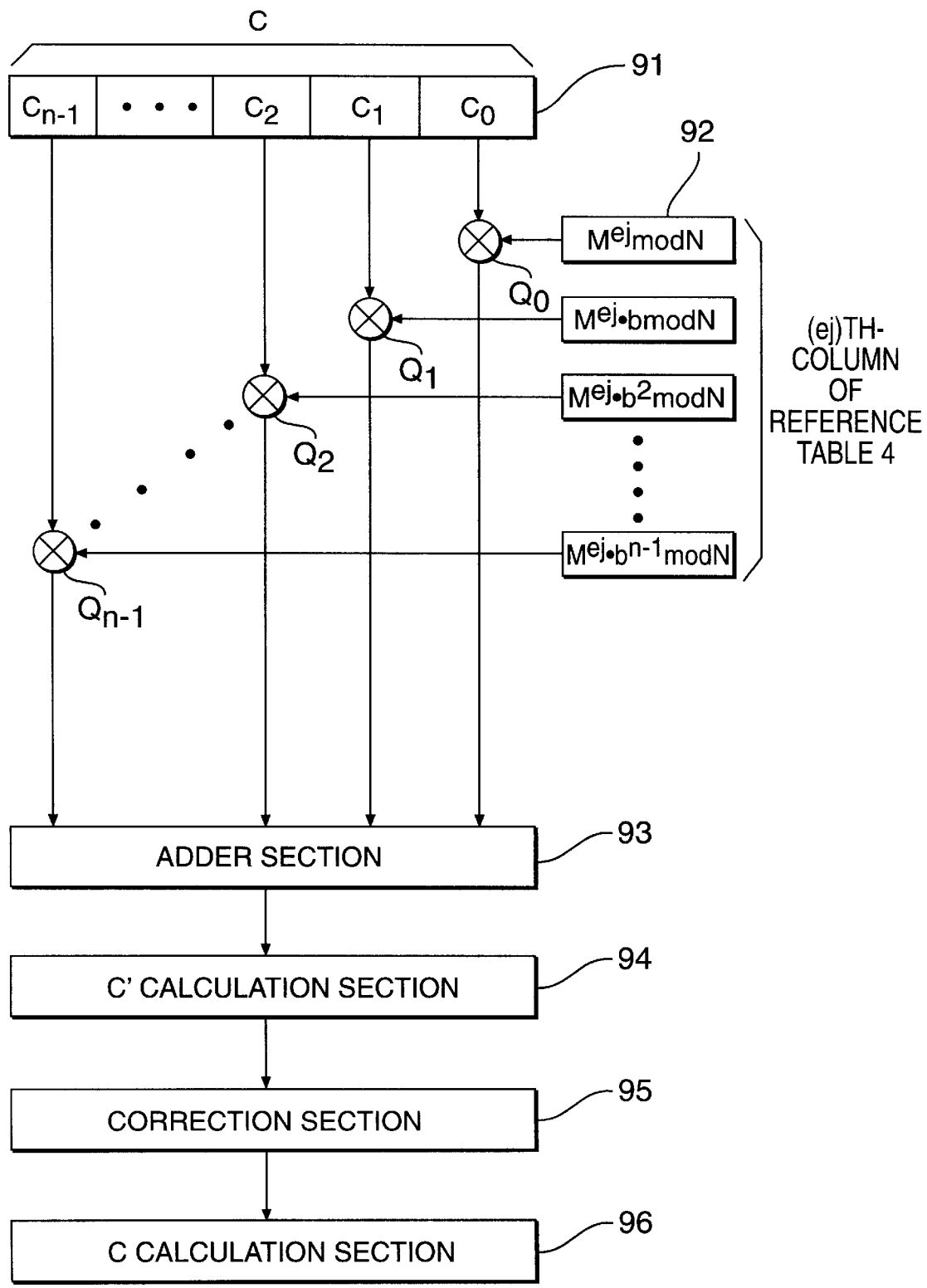
FIG. 10 is a block diagram of ($C \times A_{ej}$ modN) calculation section of the modular exponentiation calculation apparatus according to the present invention.

In this place, the processing of multiplication with constant multiplier (S55) is explained in detail referring to FIG. 9 and FIG. 10. FIG. 9 is a schematic diagram of the reference table in case of retrieving elements of (ej)th-column. FIG. 10 is a block diagram of ($C \times A_{ej}$ modN) calculation section 5 in FIG. 4. As mentioned above, the modular exponent E is expanded in base m as follows.

$$E = \sum_{i=0}^{l-1} e_j \cdot m^i \quad (0 \le ej \le m-1)$$

As shown in FIG. 9, the reference table 4 stores the elements of each column by unit of address (ej). In short, a number of the columns is m-1. Therefore, in processing of S55 in FIG. 5, in case that value of ej is not "0", the elements of (ej)th-column are retrieved according to address (ej). The retrieved elements of (ej)-th column are supplied to the ($C \times A_{ej}$ modN) calculation section 5. In the elements of (ej)th-column, variable C is expanded with base b as follows.

$$C = \sum_{i=0}^{n-1} Ci \cdot b^i$$

As shown in FIG. 10, when the variable C is inputted to the ($C \times A_{ej}$ modN) calculation section 5, each digit (Co, ... Cn-1) of the variable C is stored in a register 91. On the other hand, the retrieved elements of (ej)th-column are stored in n numbers of registers 92. Then, each digit Ci of the variable C is multiplied with corresponding element "$M^{ej} \bullet b^i$ modN" of (ej)th-column. Then n numbers of the multiplication for Ci ($0 \le i \le m-1$) are added to update c as follows.

$$\sum_{i=0}^{n-1} Ci \cdot (M^{ej} \cdot b^i \bmod N)$$

In FIG. 10, the multiplier $Q_0, Q_1, \ldots, Q_{n-1}$ respectively multiplies each digit Ci with corresponding element $M^{ej} \bullet b^i$ modN. The multiplication result from the multiplier $Q_0, Q_1, \ldots, Q_{n-1}$ are summed by the adder section 93. C' calculation section 94 outputs the sum C' of the multiplication result. The sum C' equals the final result C based on (modN). However, in comparison with the final result C, the sum C' includes an error of a multiple of N. Therefore, a correction section 95 subtracts the multiple of N from the sum C'• C calculation section 96 outputs the final result C (C>N).

As shown in FIG. 10, most part of processing time of S55 is multiplication of each digit (Ci) 91 and corresponding element ($M^{ej} \bullet b^i$ modN) 92. This processing time is equal to a multiplication of two multiprecision integral number, In short, the processing is executed at one cycle. However, in the prior art, a multiplication of (C) and ($M^{ej}$ modN) is firstly calculated and the multiplication result is secondly divided by N. In short, the processing is executed at two cycles. Therefore, the processing time of the prior art is two times of the processing time of the present invention. FIG. 11 shows a relative processing time of calculation method of the prior art and the table method. In the table method, the case of "m=16" corresponds to processing of the present invention. In the example of FIG. 11, assumed that modulus N is a 512-bit number, and $b=2^{16}$". As shown in FIG. 11, the processing time "76" of the present invention is short in comparison with the prior art.

In return to the flow chart of FIG. 5, after the multiplication with constant multiplier (S55) is calculated, the parameter (j) is decided to be "0" or not (S56). If the parameter (j) is not "0", the ($C^m$ modN) calculation section 7 calculates "$C^m$ modN" for the present variable C (S57). If the parameter (j) is "0", processing of all digit (ej) of E is finished. Therefore, the variable C as final result is outputted (S59) and all processing finishes.

A memory can be used to store instructions for performing the process described above, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A modular exponentiation calculation apparatus for calculating a modular exponentiation $C=M^E$ modN (M,N:

integral numbers, E: exponent expressed in base m, C: calculation result expressed in base b), comprising:

table generation means for calculating values of $M^j \cdot b^i$ modN (b,n,m: constant, j=1,2, ..., m−1, i=0,1, ..., n−1), and for generating a table having (m−1)-columns and n-rows in which the calculation values are stored as corresponding elements;

first calculation means for calculating a multiplication sum $$\sum_{i=0}^{n-1} Ci \cdot (M^{ej} \cdot b^i \bmod N)$$

as updated C (wherein Ci: value of each digit of C, ej: non-zerovalue of j-th digit of E, $M^{ej} \cdot b^i$ modN; row elements of ej-column of the table);

second calculation means for calculating $C^m$ modN for the updated C calculated by said first calculation means; and control means for controlling said first calculation means and second calculation means to repeat the calculation for each non-zero value of each digit of E from MSB to LSB by unit of digit.

2. The modular exponentiation calculation apparatus according to claim 1, further including an input means for inputting M as a plain text to be enciphered and N and E as an encryption key.

3. The modular exponentiation calculation apparatus according to claim 1, wherein said table generation means first calculates each element (M,M • b modN, M • $b^2$ modN, ..., M • $b^{n-1}$ modN) of the 1st column of the table using M and N, second calculates $M^2$ modN using the elements of the 1st column and M, and third calculates each element ($M^2$ bmodN, $M^2 \cdot b^2$ modN, ..., $M^2 \cdot b^{n-1}$ modN) of the 2nd column except for $M^2$ modN of the table using $M^2$ modN and N.

4. The modular exponentiation calculation apparatus according to claim 3, wherein said table generation means calculates a multiplication sum $$\sum_{i=0}^{n-1} Mi \cdot (M \cdot b^i \bmod N)$$

to calculate $M^2$ modN (wherein Mi: value of each digit of M, $M \cdot b^i$ modN: each element of 1st-column of the table).

5. The modular exponentiation calculation apparatus according to claim 4, wherein said table generation means divides ($M^2$ modN)b by N to calculate the surplus as $M^2$ •b modN, divides ($M^2$ • b modN)b by N to calculate the surplus as $M^2$ • $b^2$ midN, and repeats the division untill the surplus as $M^2 \cdot b^{n-1}$ modN is calculated.

6. The modular exponentiation calculation apparatus according to claim 3, wherein said table generation means calculates $M^j$ modN using the elements of 1st column and $M^{j-1}$ modN, calculates each element of the jth-column except for $M^j$ modN using $M^j$ modN and N, and repeats the calculation untill each element of (m−1)th-column of the table is calculated.

7. The modular exponentiation calculation apparatus according to claim 1, wherein said second calculation means calculates $C^m$ modN without the calculation performed by said first calculation means in case of zero value of ej.

8. The modular exponentiation calculation apparatus according to claim 2, further including an output means for outputting C as an encryption result of the plain text when said first calculation means and second calculation means finish the calculation for LSB of E.

9. A method for calculating a modular exponentiation $C=M^E$ modN (M,N: integral numbers, E: exponent expressed in base m, C: calculation result expressed in base b), comprising the step of:

calculating value of $M^j \cdot b^i$ modN (b,n,m: constant, j=1,2, ..., m−1, i=0,1, ..., n−1);

generating a table in a machine readable memory having (m−1)-columns and n-rows in which the calculation values are stored as corresponding elements;

first-calculating a multiplication sum $$\sum_{i=0}^{n-1} Ci \cdot (M^{ej} \cdot b^i \bmod N)$$

as updated C (wherein Ci: value of each digit of C, ej: non-zero value of j-th digit of E, $M^{ej} \cdot b^i$ modN: row elements of ej-column of the table);

second-calculating $C^m$ modN for the updated C calculated at the first-calculating step: and repeating the first-calculating step and the second-calculating step for each non-zero value of each digit of E from MSB to LSB by unit of digit.

10. A computer readable memory containing computer-readable instructions to calculate a modular exponentiation $C=M^E$ modN (M,N: integral number, E: exponent expressed in base m, C: calculation result expressed in base b), comprising:

instruction means for causing a computer to calculate value of $M^j \cdot b^i$ modN (b,n,m: constant, j=1,2, ..., m−1, i=0,1, ..., n−1);

instruction means for causing a computer to generate a table having (m−1)-columns and n-rows in which the calculation values are stored as corresponding elements;

instruction means for causing a computer to calculate a multiplication sum $$\sum_{i=0}^{n-1} Ci \cdot (M^{ej} \cdot b^i \bmod N)$$

as updated C (wherein Ci: value of each digit of C, ej: non-zero value of j-th digit of E, $M^{ej} \cdot b^i$ modN: row elements of ej-column of the table);

instruction means for causing a computer to calculate $C^m$ modN for the updated c; and instruction means for causing a computer to repeat the calcution of the multiplication sum and $C^m$ modN for each non-zero value of eact digit of E from MSB to LSB by unit of digit.

* * * * *

UNITED STATES PATENT AND TRADEMARK OFFICE
CERTIFICATE OF CORRECTION

PATENT NO. : 5,870,478
DATED : February 9, 1999
INVENTOR(S) : Shinichi KAWAMURA

It is certified that error appears in the above-indentified patent and that said Letters Patent is hereby corrected as shown below:

Claim 1, Col. 7, line 15, "modN;" should read --modN:--.

Claim 5, Col. 7, line 54, "untill" should read --until--.

Claim 6, Col. 7, line 62, "untill" should read --until--.

Claim 10, Col. 8, line 61, "calcution" should read --calculation--.

Signed and Sealed this

Twenty-sixth Day of October, 1999

*Attest:*

Q. TODD DICKINSON

*Attesting Officer*     Acting Commissioner of Patents and Trademarks